INVENTOR
Harold B. Shutterly
BY [signature]
ATTORNEY

United States Patent Office 3,462,686

Patented Aug. 19, 1969

3,462,686

SIGNAL PROCESSING AND RECONSTRUCTION APPARATUS UTILIZING CONSTANT AREA QUANTIZATION

Harold B. Shutterly, Pittsburgh, Pa., assignor to Westinghouse Electric Corporation, Pittsburgh, Pa., a corporation of Pennsylvania Filed Feb. 4, 1966, Ser. No. 525,198
Int. Cl. H04b 1/16, 7/00
U.S. Cl. 325—38 10 Claims

ABSTRACT OF THE DISCLOSURE

Signal processing and reconstruction apparatus is disclosed wherein the difference between input signals and reconstructed input signals are quantized according to a constant area to provide indication signals which are utilized to reconstruct the original input signals at a receiver and also serve as an error reference for the input signals during the quantizing operation.

The present invention relates to signal processing and reconstructing apparatus and more particularly to signal processing and reconstructing apparatus wherein the signal is processed through quantization.

The processing of electrical signals having given waveforms into other electrical signals having different waveforms of characteristics is often desirable or essential for a number of considerations. Among the reasons for signal processing are: (1) Bandwidth reduction—by suitably modifying signals having a given bandwidth, the bandwidth requirements to transmit the same intelligence may be reduced. (2) Reliability improvement—by processing the original signals into a different form having less susceptibility to noise or spurious interference the reliability of a transmission channel may be improved. (3) Secret communications—by translating a signal into an encoded form, the original intelligence may be transmitted and decoded at the receiving point. There are, of course, many other reasons for processing or modifying signals into a more usable or desired form and later reconstructing the original information than the cited examples.

Bandwidth reduction or compression is of considerable interest when the operating upon intelligence requiring a large bandwidth for transmission in its original unprocessed form. The standard transmission of television signals, for example, utilizes a 6 megacycle bandwidth. From the standpoint of recording television video information, it would be extremely desirable if the recording could be accomplished by using a much more limited bandwidth of frequencies.

One method employed for processing electrical signals which vary in amplitude with time, such as the video portion of a television signal, is that of amplitude quantization, in which a signal is sampled, at for example equal time intervals, to determine the amplitude level at each of the sampling times. The amplitude of the signal is divided into a finite number of levels, and the closest amplitude level at the time of sampling is assigned to the signal. Thus, a signal may be quantized into, for instance, 64 discrete levels of quantization. If it were desired to convert the signal quantized into the 64 levels into a binary number form, it would require 6 binary digits (bits) for each of the 64-level quantized signal samples. For the transmission of 6 binary digit group, it would therefore require, for the same transmission time, a six-times larger bandwidth than the original analog signal being processed. Even if the number of quantizing levels were reduced by one-half—to 32 amplitude levels—5 bits of information, requiring five-times the bandwidth, would have to be transmitted for each quantized signal sample.

If a direct transmission of the quantized signal is considered, which does not increase the bandwidth requirement, difficulty arises in discriminating between amplitude levels as the number of discrete levels increase, and then an even greater difficulty appears in trying to recover this amplitude level after transmission.

Although amplitude quantizing is capable of producing an adequate representation of the original signal, it is inefficient in terms of the quantity of information required, since it quantizes rapidly changing portions of the input signal as finely as slowly changing portions. A reduction in the information rate could be achieved without affecting the subjective quality of the picture if the rapidly changing portions were quantized more coarsely and slow changing portions more finely.

A system which avoids the inefficiency of amplitude quantization is that of constant area signal quantization. Such a system may be defined as one wherein: a signal is quantized to produce a change in output whenever the time integral of the difference between the input signal and the output signal from the quantizer exceeds a predetermined amount. The output from a constant area quantizer can be represented by a series of pulses having uniform amplitude but varying in the time spacing between pulses. The pulses produced would have three levels, i.e., positive, negative and zero. This would require approximately 1.6 binary digits for representation of each sampling interval of the waveform.

The information in the constant area quantizer is conveyed through the time difference between pulses, and the accuracy of reconstruction of the original signal depends upon an assumed knowledge of small changes in the original signal. The reconstructed waveform results from a summation of all previous approximations. Thus, errors in the individual changes in the output tend to accumulate unless corrected in some systematic fashion. The errors are principally due to differences between the actual shape and the assumed shape of the small intervals of the input waveform. It therefore becomes imperative that some form of error compensation be introduced into the constant area quantizing operation in order to avoid the non-correlation of reconstructed and original signals.

It is, therefore, an object of the present invention to provide new and improved signal processing and reconstructing apparatus.

It is a further object of the present invention to provide new and improved signal processing and reconstructing apparatus using constant area quantizing techniques.

It is a further object to provide new and improved signal processing and reconstructing apparatus utilizing constant quantizing techniques wherein compensation for errors between the original and reconstructed signals systematically compensated for, is employed.

It is a further object of the present invention to provide new and improved constant area quantizing apparatus for processing and reconstructing signals wherein errors between the original and reconstructed signals are systematically compensated for through feedback correction.

The above cited objects are accomplished generally by providing signal processing and reconstruction apparatus, in which the difference between input signals and reconstructed input signals is quantized according to a constant area to provide indication signals. The input signals are reconstructed by generating a function in time correspondence to the quantizing operation, sampling the function in response to the input signal and integrating the samples. The reconstructed input signals are utilized to approximate the original intelligence of the input signals and to act as a reference for the input signals during the quantizing operation.

These and other objects and advantages of the present invention will become more apparent when considered in view of the following specification and drawings in which.

Figure 1:
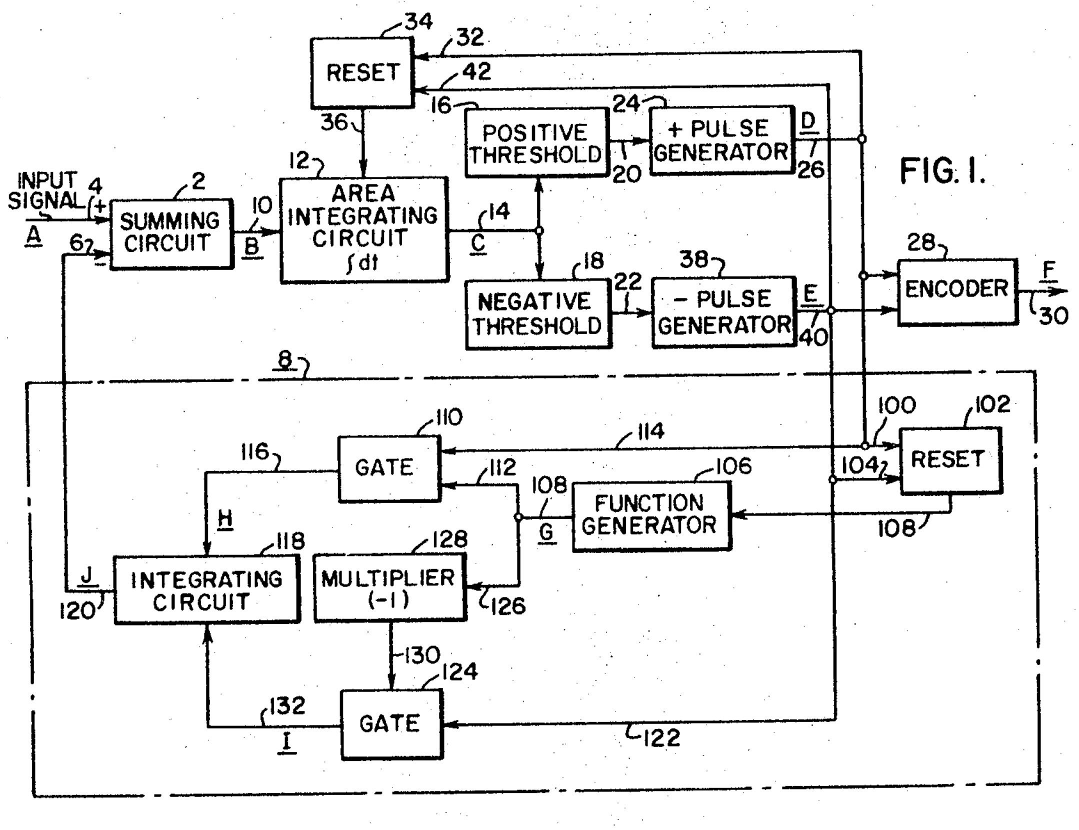
FIG. 1 is a block diagram of the signal processing and reconstructing apparatus of the present invention.
Figure 2:
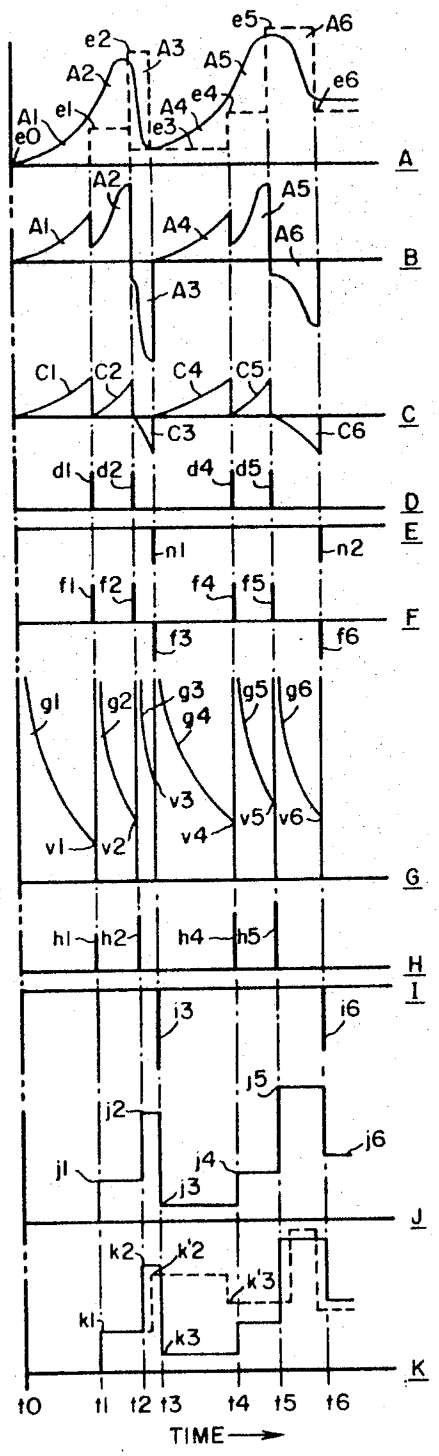
FIG. 2 is a composite waveform diagram showing the waveform appearing at various points in the apparatus of the present invention and includes curves A through K which are used in the explanation of the present apparatus.

Referring now to FIGS. 1 and 2, in FIG. 1 is shown the signal processing apparatus of the present invention in block form, wherein an input signal is applied to a summing circuit 2 at an input 4. A representative input signal is shown in curve A of FIG. 2, and may comprise a video signal of the waveform commonly supplied in television transmission, with the amplitude of the signal being indicative of the light output of the original video information. It is assumed at a time *t*0 that the amplitude of the video signal is a value *e*0 which may, for example, correspond to the black level of transmitted video information.

Applied to another input terminal 6 of the summing circuit 2 is a feedback reference signal which is generated in a feedback reconstruct circuit 8, enclosed within the so legended dotted block. The feedback reconstruct circuit 8 will be described in more detail below. However, for the time being, assume that the output provided at the lead 6 is of an amplitude equal to the previous sampling period of video signal. Thus, at the time *t*0, the amplitude of the feedback signal applied at the input 6 would be held at the value *e*0 until the end of the sampling period which will end at a time *t*1. The summing circuit 2 may be any well known circuit capable of taking the algebraic sum of two analog input signals, with the plus and minus polarities indicated at the inputs 4 and 6, respectively.

The difference or error signal output of the summing circuit 2 appears at a lead 10 and is shown in curve B of FIG. 2. The waveform as shown in curve B is applied to an integrating circuit 12. The function of the integrating circuit 12 is to take the integral of the difference waveform shown in curve B with respect to time. In other words, the output, at a lead 14 as shown in curve C of the integrating circuit 12 will be the area under the curve of the difference signal, indicated as A1 in curve A. The output at lead 14 is shown as C1 in curve C. It is assumed at the time *t*0 and at the beginning of each of the sampling periods that the integrating circuit 12 is reset to have a nominal output value. Thus, as time proceeds in the sampling interval, the output appearing at the lead 14 of the integrating circuit 12 will increase to a predetermined value, either positive or negative polarity as indicated in curve C of FIG. 2. The integrating circuit 12 may comprise any well known type circuit capable of taking the time integral of an input function applied thereto.

The video input signal of curve A is to be quantized according to a constant area. That is, when a predetermined area under the curve of the difference signal is reached, an indication of this, at that instant in time, is given by the apparatus. In a clocked system, wherein a sample of the difference signal is taken at fixed time limits, this indication would, however, be delayed until the next clocking interval. The area integrating circuit 12 is then reset to begin the next quantizing period. The predetermined area value is indicated in curve A as as the area A1 which is reached at the time *t*1.

Connected to the output 14 is a positive threshold circuit 16 and a negative threshold circuit 18. The positive and negative threshold circuits 16 and 18 are operative to provide an output signal at their respective outputs 20 and 22 whenever a predetermined signal level is exceeded, indicative of the constant area having been reached. The threshold circuits 16 and 18 may comprise any well known circuits or devices which, when a predetermined signal level is reached, provide an output indication, such as biased diodes, transistor multivibrators or other similar devices.

Thus, at the time *t*1 when the constant area A1 is reached, a sufficient magnitude signal will appear at the output of the area integrating circuit 12 to break over the threshold level of the positive threshold circuit 16 to provide an output signal at the output 20 thereof. The output appearing at the lead 20 at the time *t*1 is supplied to a plus pulse generator 24 which produces in response thereto an output pulse *d*1, as indicated in curve D of FIG. 2, having positive polarity. The pulse generator 24 may comprise any standard design which produces a positive polarity pulse output in response to a signal being applied to its input.

The output, *a* at lead 26, of the pulse generator 24 is applied to an encoder circuit 28 at one input thereof. The encoder 28 may comprise an adding circuit which translates the sum of its input signals to an output 30 as shown in curve F of FIG. 2. Of course, if desired, the encoder 28 may process the pulses in such a way to encode them for security purposes, or may further process them to better enable the transmission thereof to receiving or reconstruction apparatus.

The output 26 of the pulse generator 24 is also applied through a lead 32 to a reset circuit 34. In response to the pulse *d*1 of the pulse generator 24 at the time *t*1, the reset circuit supplies an output signal at its output lead 36 which is applied to the area integrating circuit 12. The function of the reset output is to reset the area integrating circuit 12 back to its nominal value. By resetting the area integrating circuit 12 to a nominal output value, the next quantizing period begins and lasts until a constant predetermined area is reached under the difference signal curve.

At the time *t*1 the next quantizing period begins. At this time the amplitude of the video signal is as shown in curve A. It is assumed that the feedback signals from the feedback reconstruct circuit 8 at the lead 6 of the summing circuit 2 is at the value *e*1 and is held at that value until the end of the sampling period at a time *t*2. The difference between the input video signal from the time *t*1 to the time *t*2 and the constant value *e*1 during this time period appears as the output of the summing circuit 2. This signal is then applied to the area integrating circuit 12 wherein it is integrated to provide the waveform C2 as shown in curve C. The integration process will continue until the time *t*2 when the constant area is reached which is indicative of the area A2 between the times *t*1 and *t*2. The areas A1 and A2 are equal. At the time *t*2 when the constant area is reached, the positive threshold of the positive threshold circuit 16 is exceeded to provide an output from the threshold circuit 16 to the pulse generator 24, which in turn provides an output *d*2 as indicated in curve D. The pulse *d*2 is applied to the encoder 28 and also to the reset circuit 34 which resets the area integrating circuit 12 to its nominal output value to begin the next quantizing period.

At the time *t*2 the video signal, as shown in curve A, begins to take a negative slope; thus indicating that the amplitude of the video signal is decreasing from a high light output to a lower intensity light output. The decreasing amplitude input signal is applied to the input 4 of the summing circuit, while to the feedback input 6 of the summing circuit 2 is applied a signal having a value *e*2 which is indicative of the amplitude of the video signal at the end of the sampling time ending at time *t*2. The application of the signal having the value *e*2 as a feedback signal will continue until a time *t*3 at the end of the sampling period. Because of the algebraic addition in the summing circuit 2, the output appearing at the lead 10 of the summing circuit 2, as shown in curve B of FIG. 2, will have a negative polarity. Thus, the output of the area integrating circuit 12 will also have a negative polarity as shown in pulse C3, curve C of FIG. 2. The integrating process in the area integrating circuit 12 will continue until a time $t3$ when the predetermined constant area is reached as indicated by the area A3 in curve A, which is taken to be equal to the areas A1 and A2 as previously described. Whenever the negative threshold is exceeded at the time $t3$, the negative threshold circuit 18 will provide an output to a negative pulse generator 38. The output of negative pulse generator 38 is shown as the pulse $n1$ in the curve E of FIG. 2. The output lead 40 of the pulse generator 38 is applied to the encoder circuit 28. Also the output 40 of the negative pulse generator 38 is connected through a lead 42 to the reset circuit 34. The reset circuit is operative to provide, in response to the signal from the negative pulse generator 38, an output signal at its output 36, which in turn resets the area integrating circuit 12 to its nominal output value. Therefore, the quantizing operation provides output signals, such as $d1$, $d2$ and $n1$, in response to any input video waveform. As shown in curve E, the negative pulse $n1$ is provided at time $t3$ and is indicative that the slope of the input signal was negative during the preceding quantizing interval.

Alternatively, the pulse generators 24 and 38 could be driven by a clock source to provide an output signal in response to clocking pulses provided thereto at predetermined time intervals.

Curve F of FIG. 2 shows the output of the signal processing apparatus of FIG. 1 including positive polarity pulses $f1$ and $f2$ corresponding to the pulses $d1$ and $d2$ of curve D and a negative polarity pulse $f3$ corresponding to the negative pulse $n1$ of curve E. The polarity of these pulses is indicative of the slope of the curve of the video input signal, and the time interval between the occurrence of the pulses is indicative of the amplitude change during the time interval. By a knowledge of the approximate waveform of the input signals, the constant area and the time interval between pulses, it is possible to calculate the amplitude of the original input signal at the end of the sampling interval and to reconstruct the original input information.

In order to reconstruct the input waveform of curve A from the waveform shown in curve F of FIG. 2, it is assumed that the waveform of curve A between the sampling intervals is approximately a triangular waveform. The area under the curve can be defined then by the equation:

$$A = \tfrac{1}{2}\Delta t \Delta e \quad (1)$$

where $\Delta t$ is equal to the sampling time interval and $\Delta e$ is equal to the change in amplitude of the signal during the time interval $\Delta t$. For example, the area A1 as indicated by curve A may be defined by the equation:

$$A1 = \tfrac{1}{2}(t1 - t0)(e_1 - e_0) \quad (2)$$

Equation 1 can be solved for the change in amplitude to give:

$$\Delta e = 2A/\Delta t \quad (3)$$

By knowing the constant area that is to be selected as the quantizing area and by knowing the quantizing time difference the change in amplitude can be found. Moreover, the polarity of the solution will indicate in which direction the original input signal is going. Of course, waveforms other than the triangular one can be assumed to give an appropriate approximation of the waveform of the input signals. However, for a video signal input the triangular waveform chosen is a very adequate assumtion and will be used for examplary purposes herein.

Figure 3:
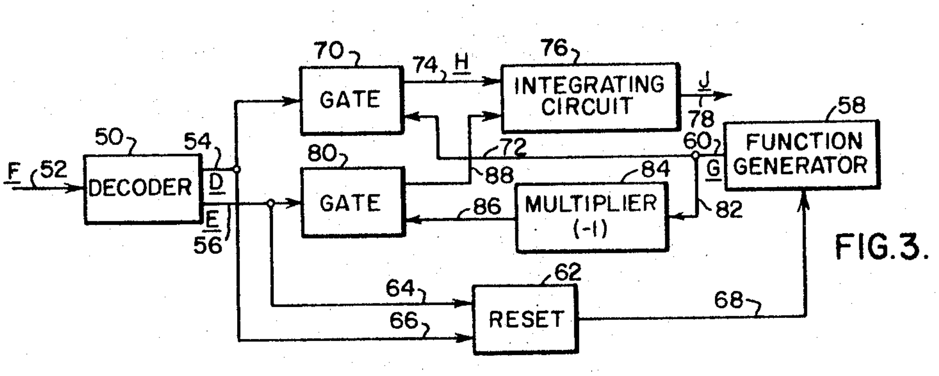
FIG. 3 is a block diagram showing the signal reconstructor apparatus of the present invention.
Figure 4:
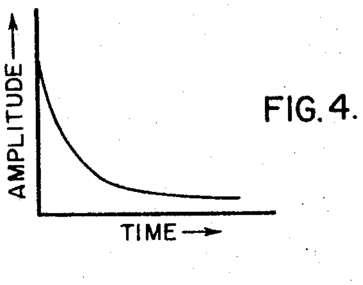
FIG. 4 is a plot of amplitude versus time for a function generator as used herein.

In FIG. 3 is shown reconstruction apparatus which is capable of reconstructing the waveform provided in curve F of FIG. 2 into a reconstructed waveform approximating the original waveform of curve A. The waveform F is applied to decoder circuit 50 through an input 52. The output 30 of the encoder 28 of FIG. 1 and the input 52 of the decoder 50 may be connected through any suitable transmission link. The decoder 50 operates to separate the waveform of curve F into its positive and negative polarity signals of the form as shown, respectively, in the curves D and E at its outputs 54 and 56 respectively. A function generator 58 is provided in order to generate signals having an amplitude corresponding to the amplitude of the signal being quantized at the end of a given quantizing period. In the present case, assuming that the wave shape of the input information is assumed to be triangular and Equation I above applies, the function generator 58 would provide an amplitude versus time plot such as shown in FIG. 4 so that amplitude varies inversely with time in a monotonic manner. That is, the plot of FIG. 4 represents a plot of $\Delta e$ versus $\Delta t$ for a constant area A. A zero time value is shown in FIG. 4 at the origin indicating a reset position. If, of course, another wave shape were assumed, the function generator would be required to supply an amplitude versus time plot corresponding to that of the assumed wave shape.

Curve G of FIG. 2 also shows the output of the function generator 58 supplied at its output 60 during the various quantizing increments of time. In the reconstruction apparatus of FIG. 3, a reset circuit 62 is provided having inputs 64 and 66. To these inputs are applied the pulses corresponding to curves D and E of FIG. 2, respectively. In response to an input pulse being supplied to either the input 64 or 66, an output is supplied and an output 68 of the reset circuit 62, which operates to reset the function generator 58 at its zero time position, see FIG. 4, and begins the function generator to produce the amplitude versus time plot of FIG. 4 and curve G of FIG. 2.

Thus, in FIG. 3, presuming that the function generator 58 is reset at the time $t0$, a curve $g1$ will be provided at the output 60 thereof beginning at the time $t0$. At the end of the quantizing intreval at time $t1$, the curve $g1$ will have reached a value $v1$ as shown at the time $t1$ of curve G. At the time $t1$ a pulse corresponding to the pulse $d1$ of curve D is applied to the reset circuit 62, which then supplies an output to the function generator 58 to reset the function generator at its zero time position. At the time $t1$ a pulse corresponding to the pulse $d1$ of curve D is also applied to a gate circuit 70. The other input to the gate circuit is applied through a lead 72 connected to the output 60 of the function generator 58. At the time $t1$ the value $v1$ generated by the function generator 58 is present at the lead 72. The application of a pulse corresponding to the pulse $d1$ causes the gate 70 to permit the application of the value $v1$ to be applied from the gate 70 through a lead 74 to the input of an integrating circuit 76. The output of the function generator appearing at the lead 74 at the time $t1$ is shown in curve H of FIG. 2 a pulse signal $h1$. The integrating circuit 76 will hold this value until the end of the next quantizing period at a time $t2$.

The output of the integrating circuit 76 is shown in curve J of FIG. 2, wherein during the initial quantizing period $t0$ to $t1$ it is assumed that the output is at a nominal value and that at the time $t1$ the value jumps to the value $j3$, corresponding to the output $v1$ of the function generator 58 at the time $t1$ as shown in curves G and H.

At the time $t1$ the function generator 58 is reset to its initial value by the reset circuit 62. At this time, the function generator 58 begins to generate a curve $g2$ as shown in curve G of FIG. 2. The function generator continues to supply the curve $g2$ until the time $t2$ when a pulse corresponding to the pulse $d2$ of curve D is applied to the gate circuit 70 to permit the output $v2$, at time $t2$, of the function generator 58 to be applied to the integrating circuit 76. At the time $t2$ the signal applied to integrating circuit 76 is shown as the pulse $h2$ of curve H. At the time $t2$, then the output $h2$ of the integrating circuit 76 goes to a value $j2$ as shown in curve J representing the sum of the values $v1$ and $v2$. It should be noted that the value $j1$ in curve J is held by the integrating circuit 76 during the following quantizing interval. The next value, corresponding to the pulse $h2$ of curve H, is added thereto to supply the total output $j2$ at the time $t2$. The value $j2$ will be held until the end of the quantizing integral ending at time $t3$. At the time $t2$ the function generator 58 is reset to its initial position.

Between the times $t2$ and $t3$, a curve $g3$ as shown in curve G is generated. At the time $t3$ a pulse corresponding to the pulse $n1$ of curve E is supplied to a gate circuit 80 to permit the gate 80 to pass signals appearing at its other input. The output from the function generator 58 is supplied through a lead 82 to a negative multiplier 84 which changes the positive polarity output of the function generator 58 to a negative polarity signal at its output 86. Upon the closing of the gate 80 at the time $t3$, the negative going output of the gate 80 is applied through a lead 88 to another input of the integrating circuit 76. The output applied at the lead 88 is shown as the pulse $i3$ of curve I of FIG. 2, having an amplitude $v3$ as shown in curve G. The negative going signal 13 is algebraically added to the signal level $v2$ appearing at the integrating circuit 76 so that at the time $t3$, as shown in curve J, the level of the waveform produced at the output 78 of the integrating circuit 76 is reduced to the value $j3$. The value $j3$ will then continue until the end of the next quantizing interval at the time $t4$.

It can thus be seen by comparing curves A and J of FIG. 2 that the output of the integrating circuit 76 is an approximation of the original video input signal and contains enough information for the substantially reproduction of the original video information appearing in the video input signal. It should also be noted that a relatively long time period occurs between the times $t1$ and $t0$ when the rate of change of amplitude is relatively low, while the time period between times $t2$ and $t3$ is relatively short when there is a rapid change of amplitude of the video signal. This is highly desirable since, as mentioned previously, it permits a closer reconstruction of the original input waveform with slowly changing, persistent signal levels being reconstructed at smaller amplitude changes, and rapidly changing high frequency signals being reconstructed according to faster, coarser amplitude changes.

Referring back to FIG. 1, the reconstruct feedback circuit 8 will now be described. The reconstruct feedback circuit performs two functions: (1) provides a fixed level to be compared with the input signal during a given quantizing period, and (2) compensates for any errors which occur between the constructed signal as shown in curve J of FIG. 2 and the original input signal of curve A. Without the feedback circuit 8, errors between the reconstructed waveform and the original waveform would not be compensated for except in an unsystematic manner. The use of the reconstruct feedback circuit 8 provides a systematic correction so that the reconstructed waveform and the original waveform are closely correlated.

The feedback reconstruct circuit 8 and the reconstruct apparatus of FIGURE 3 are substantially similar in construction and function, since it is desired that the feedback reconstruct circuit 8 generate exactly the same waveform as the output waveform of the reconstruct circuit of FIG. 3.

The waveforms are substantially similar. The waveform generated by the feedback circuit 8 may be compared with the original input waveform of curve A and act as an error correction signal therefor.

Referring now to the block 8 of FIG. 1, the output of pulse generator 24 is applied to an input 100 of a reset circuit 102. Also, the output of the negative pulse generator 38 at its output 30 is applied to an input 104 of the reset circuit 102. The reset circuit 102 is operative to reset a function generator 106 by applying an output signal through its output 108. The function generator 106 is substantially similar to the function generator 58 of FIG. 3 and generates a monotonically decreasing waveform as shown in FIG. 4 which has an effectively zero reset time with the amplitude of the waveform then decreasing with time. The output of the function generator 106 will provide the waveforms as described with reference to curve G of FIG. 2. Thus, at the time $t0$, a waveform such as $g1$ of curve G is generated by the function generator 106. This output is applied to a gate circuit 110 through a lead 112 connected to the output of the function generator 106. The gate 110 is controlled by being connected to the output 26 of the pulse generator 24 through a lead 114. At the time $t1$ when the pulse $d1$ of curve D is supplied from the pulse generator 24, the gate 110 will permit a signal corresponding to the signal $v1$ of curve G, appearing at that time at the output of the function generator 106, to be applied to an input 116 of an integrating circuit 118 as a signal corresponding to the pulse $h1$ of curve H. The integrating circuit 118 integrates the value corresponding to $v1$ of curve G to provide a corresponding output value $j1$, curve J of FIG. 1, at its output terminal 120 which is connected to the input 6 of the summing circuit 2. The output of the integrating circuit 118 corresponds to curve J of FIG. 2 and has the value $j1$ at the time $t1$, which is maintained by the integrating circuit 118 until the end of the next sampling period at time $t2$.

At the time $t1$ the output pulse $d1$ from the pulse generator 24 is also applied to the reset circuit 102 which causes the reset circuit 102 to apply a signal through its output 108 to the function generator 106 to reset it so as to generate a curve corresponding to $g2$ as shown in curve G during the time $t1$ to $t2$. At the time, $t2$, at the end of the quantizing interval, the pulse $d2$ is applied to the gate 110 which permits a value corresponding to $v2$ of curve G, from the function generator 106, as a pulse corresponding to $h1$ of curve H, to be applied through the gate 110 to the input of the integrating circuit 118. The output of the integrating circuit 118 then goes to a value $j2$, which is the sum of the values corresponding to $v1$ and $v2$ of curve G. The value $j2$ is applied to the input 6 of the summing circuit 2 and held during the next sampling interval $t2$ to $t3$. The pulse $d2$ is also applied to the reset circuit 102 which accordingly resets the function generator 106 to its zero value at the time $t2$ where it begins to generate a curve corresponding to $g3$ as shown in curve G of FIG. 2.

At the time $t3$, a negative pulse $n1$, as shown in curve E, is applied by the negative pulse generator 38 from its output 40 to a lead 122 which is connected to a gate circuit 124. The output of the function generator 106 is connected through its output 108 to a lead 126 to the input of a negative multiplier circuit 128 which operates to change the polarity of the function generator output to a negative one. The output of the multiplier 128, at a lead 130, is applied to the gate circuit 124. At the time $t3$, the application of the pulse $n1$ to the gate circuit 124 permits the output of the function generator 106, after being given a negative polarity by the multiplier circuit 128, to be applied to the gate 124. The negative output having a value $-v3$, see curve G, is applied at an input 132 of the integrating circuit 118. The input applied at lead 132 is shown in curve I of FIG. 2 corresponding to the signal value $i3$. The value appearing at the lead 132 is added algebraically to the composite input to the integrating circuit 118 having occurred over past sampling intervals so that the integrated output at the output 120 of the integrating circuit 118 is shown as a value $j3$ in curve J of FIG. 2. The value $j3$ will then be held until the end of the next quantizing period ending at a time $t4$. It can thus be seen that the output of the integrating circuit 118 which is applied as an error and reference signal to the summing circuit 2 is equivalent to the output 78 of the integrating circuit 76, both the outputs being represented in curve J of FIG. 3. By use of the reconstruct feedback circuit 8, the processing circuit of FIG. 1 is capable of exactly tracking the reconstructed signal that appears at the reconstruct circuit of FIG. 3. This is important since by this manner there is a systematic correction and correlation of the input signal with the reconstructed signal so that ambiguities between the reconstructed and original information will not occur.

The importance of providing feedback error correction with the reconstructed waveform may be seen from the following analysis.

By using the feedback reconstruct circuit 8 as shown in FIGURE 1, the quantizing process will continue as described above with the next quantizing period ending at the time *t*4 when an area A4, which is the value of assumed constant area, is reached to provide a pulse *d*4 as shown in curve D in response to the waveform C4 of curve C as provided at the output of the integrating circuit 12. At the time *t*5 at the end of the next quantizing period when a constant area A5 is reached, the pulse *d*5 will be generated in response to the pulse *c*5 of curve C; and at the time *t*6 a negative pulse *n*6 will be generated as shown in curve E of FIG. 2 in response to the pulse *c*6 of curve C. These pulses will be combined in the encoder 28 for transmission to the reconstruct apparatus of FIG. 3 as the pulses *f*4, *f*5 and *f*6 as shown in the curve F.

The waveform of curve F, or a coded version thereof, is transmitted to decoder 50 which regenerates waveform F to control the signal reconstruction of FIG. 3. As described previously, the function generator 58 generates the curves *g*4, *g*5 and *g*6 as shown in curve G. In response to the values of the functions at the respective times, values *v*4, *v*5 and *v*6, curve G, are applied as signals *h*4, *h*5 and *i*6, curves H and I, are applied to the integrating circuit 76. This circuit then supplies as its output the curve J at the respective times having the values *j*4, *j*5 and *j*6.

It can be seen by the comparison of the curves J and A during these time intervals that the input waveform is substantially approximated thereby. Similarly, the curve J will be generated during these time intervals by the reconstruct feedback circuit 8 so that the values *j*4, *j*5 and *j*6 are applied as feedback signals to the summing circuit 2 in order for processing apparatus and reconstruct apparatus substantially track each other.

Assume, however, that the reconstruct feedback circuit 8 is not utilized, but rather the outputs of the pulse generators 24 and 38 are employed to clamp the signal on lead 120 to the value of the input signal and holds that value fixed until the end of the next quantizing cycle when another pulse is provided by either of the pulse generators 24 or 38. As previously mentioned, at the reconstructor apparatus of FIG. 3 the input waveform is assumed to have a triangular waveform. This assumption results in a difference between the waveform produced on lead 120 and the reconstructed waveform produced by the reconstructor apparatus at lead 78.

This results in a new output waveform from lead 120 and also alters the time periods of the quantizing cycles. Consequently, the output from the encoder 28 is altered. The waveform then produced at lead 78 of the reconstructor apparatus is therefore also altered.

Curve K shows the two waveforms that would be produced at lead 78 under the two assumed conditions. The solid waveform is produced when the feedback reconstruct circuit 8 operates as previously described. The dotted waveform is produced when the output at lead 120 is clamped to the input signal value at the end of each quantizing cycle.

In curve K, at the time *t*1, both waveforms will have the same value *k*1, since it has been assumed that output of lead 120 is initially the same. However, at the time *t*1, at the lead 120, the values of the signals for the different modes of operation would differ. This results in a difference in signals at the lead 10 to the area integrating circuit 12 such that the end of the next quantizing cycle ends later somewhat after time *t*2, for the clamped mode. Consequently the magnitude of the level *k'*2 is smaller than *k*2 of the solid curve.

Because the input signal is decreased rapidly after time *t*2, the value of the signal to which the lead 120 is clamped, at the time when the change to level *k'*2 occurs, is much smaller than the value *k*2. As a result, the signal on, lead 10 to the area integrating circuit 12 is greatly reduced, and then the value *k'*3 occurs much later than the value *k*3. Since the magnitude of the change produced in the reconstructor apparatus of FIG. 3 is inversely related to the time between changes, the magnitude of the change to reach the level *k'*3 is much smaller than the change to reach level *k*3.

It can thus be seen that errors are produced at the output lead 78 of the reconstructor apparatus in the clamped mode of operation. These errors will continue to occur over the quantizing cycles and will accumulate to produce gross errors unless compensated for in some systematic fashion.

In the apparatus of the present invention, however, the use of the feedback reconstruct circuit 8 reconstructs the waveform that will be generated at the reconstruct apparatus of FIG. 3, and utilizes this signal as a feedback error signal to correlate systematically the received signal to be reconstituted with information available at the processing apparatus. Thus, by the use of the feedback correction, the processing apparatus has available locally the same reconstructed waveform that is reproduced at the reconstruction apparatus. In this way the processing apparatus and receiving reconstruct apparatus are tied together to avoid errors and ambiguities being introduced between the original and reconstructed information due to assuming the wave shape of the original input signal. Signals reconstructed according to the assumed triangular wave shape will always be correlated and the reconstruct and processing apparatus will thereby track.

Although the present invention has been described with a certain degree of particularity, it should be understood that the present disclosure has been made only by way of example and that numerous changes and the details of construction and fabrication in the combination and arrangement of parts, elements and components can be resorted to without departing from the scope and the spirit of the present invention.

What is claimed is:

1. Signal processing and reconstructing apparatus operative with input signals and reconstructed signals comprising:

processing means for processing the difference between said input signals and said reconstructed signals including integrating means for integrating said difference until a predetermined integral of said difference is obtained and threshold means responsive to said predetermined integral being obtained for providing indication signals in response thereto; and reconstruct means to reconstruct said input signals in response to said indication signals and provide said reconstructed signals.

2. The apparatus of claim 1 wherein said reconstruct means comprises:

function generating means to generate a function in time correspondence to the processing operation of said processing means; and sampling means to sample the output of said function generating means in response to said indication signals and to supply said processing means with said reconstructed signals in response thereto.

3. The apparatus of claim 2 further including:

summing means for providing the difference between said input signals and the reconstructed signals generated by said apparatus.

4. The apparatus of claim 3 also including:

means for transmitting said indication signals; and receiving reconstruct means for receiving said indication signals transmitted and for reconstructing said input signals in response to said indication signals transmitted.

5. The apparatus of claim 3 wherein:
said input signals have a waveform which may be approximated by a selected mathematical function; and
said function generating means is operable to generate a mathematical function related to said selected function.

6. The apparatus of claim 5 wherein:
said integrating means includes constant area integrating means for integrating the difference between said input signals and said reconstruction signals until a predetermined value of integral is reached to define a processing interval;
said function generating means generating a mathematical function related to said selected mathematical function and being operative to generate its related function in time correspondence with the integration process of said constant area integrating means;
said sampling means including reconstruct integrating means to integrate the output of said function generating means and to hold that value of output and apply it to said summing means so as to act as a reference signal to said input signal during the next processing interval.

7. The apparatus of claim 6 and also including:
reset means responsive to said indication signals to reset said constant area integrating means and said function generating means each time said predetermined value of integral is reached.

8. The apparatus of claim 7 also comprising:
means for transmitting said indication signals;
receiving reconstruct means for receiving said indication signals transmitted including:
reconstruct function generating means responsive to said indication signals transmitted to generate the selected mathematical function in response thereto;
reconstruct sampling means to sample the output of said function generating means in response to said indication signals transmitted; and
reconstruct integrating means to integrate the output samples from said function generating means and to hold this value during each of the processing intervals so as to reconstruct the original input signals.

9. The apparatus of claim 7 including:
encoder means for translating said indication signals to be intransmissible forms.

10. The apparatus of claim 9 also comprising receiver reconstruct means including:
decoder means for translating output signals from said encoder means into decoded signals substantially similar to said indication signals;
reconstruct function generating means to generate the selected mathematical function in response to said decoded signals;
reconstruct sampling means to sample the output of said function generating means in response to said decoded signals; and
reconstruct integrating means to integrate the output sampled from said function generating means and to hold this value during each of the processing intervals so as to reconstruct the original input signals.

References Cited

UNITED STATES PATENTS 2,605,361 7/1952 Cutler ............. 325—38.1

ROBERT L. GRIFFIN, Primary Examiner

J. A. BRODSKY, Assistant Examiner

U.S. Cl. X.R.

178—6; 332—11